(12) United States Patent
Hardt et al.

(10) Patent No.: US 9,584,855 B2
(45) Date of Patent: Feb. 28, 2017

(54) TRANSFER OF CONTENT BETWEEN SCREENS (71) Applicant: ARRIS Enterprises, Inc., Suwanee, GA (US)

(72) Inventors: Charles Hardt, Lawrenceville, GA (US); Albert F. Elcock, West Chester, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 66 days.

(21) Appl. No.: 14/584,005

(22) Filed: Dec. 29, 2014

(65) Prior Publication Data
US 2016/0191989 A1    Jun. 30, 2016

(51) Int. Cl.
*H04N 21/84* (2011.01)
*H04N 21/436* (2011.01)
*G06F 3/14* (2006.01)
*H04N 21/443* (2011.01)
*H04N 21/4363* (2011.01)
*H04N 21/485* (2011.01)
*H04N 21/8547* (2011.01)

(52) U.S. Cl.
CPC ..... *H04N 21/43615* (2013.01); *G06F 3/1423* (2013.01); *H04N 21/43635* (2013.01); *H04N 21/443* (2013.01); *H04N 21/485* (2013.01); *H04N 21/8547* (2013.01)

(58) Field of Classification Search
CPC combination set(s) only.
See application file for complete search history.

(56) References Cited

U.S. PATENT DOCUMENTS

2004/0183756 A1* 9/2004 Freitas .................. G06F 9/4443
                                                   345/73
2015/0208135 A1* 7/2015 Sirpal ................ H04N 21/4858
                                                   725/40

* cited by examiner

*Primary Examiner* — Kieu Oanh T Bui
(74) *Attorney, Agent, or Firm* — Bart A. Perkins (57) ABSTRACT

Methods, systems, and computer readable media can be operable to facilitate the transfer and/or sharing of content between multiple devices. An interface may be used by a subscriber to cause content being viewed on a first device to be displayed at one or more other devices. Using an interface at a control device or source device, a user can select a content source, one or more target devices, and various options for outputting content from the content source at the target device(s). Selected content may be shared with or transferred to a target device.

18 Claims, 5 Drawing Sheets

TRANSFER OF CONTENT BETWEEN SCREENS

TECHNICAL FIELD

This disclosure relates to controlling display of content at multiple screens.

BACKGROUND

Multimedia content continues to be made available for consumption on a multitude of various devices. Users typically have the capability to access multimedia content at a plurality of devices within a subscriber premise and the content may be provided to a user via various transmission standards and mediums. With the continued growth and mixture of content consuming devices within a premise, it is desirable to improve upon systems and methods for facilitating interactions between the devices.

With various devices and screens from which to view content, it is desirable for a user to have the capability to efficiently control the output of content at the various devices. For example, a user viewing content within a first location of a premise on a first device might want to continue viewing the content at a second location of the premise or on a second device. Also, at any given time, multiple users may be viewing different content on different devices within different locations of a subscriber premise. It can be beneficial to provide a user the ability to share or suggest content with another user within the premise. It may also be beneficial to provide a user the ability to share or suggest content with a screen from outside of the premise. Therefore, it is desirable to improve upon methods and systems for facilitating control of displayed content at multiple devices or screens.

BRIEF DESCRIPTION OF THE DRAWINGS

Like reference numbers and designations in the various drawings indicate like elements.

DETAILED DESCRIPTION

It is desirable to improve upon methods and systems for controlling display of content at multiple devices. The methods, systems, and computer readable media described in this disclosure enable the transfer and/or sharing of content between multiple devices. An interface may be used by a subscriber to cause content being viewed on a first device to be displayed at one or more other devices. Using an interface at a control device or source device, a user can select a content source, one or more target devices, and various options for outputting content from the content source at the target device(s). Selected content may be shared with or transferred to one or more target devices.

A user may access an application at a control device, wherein the application allows the user to select, share, and/or transfer content to one or more target devices. The selection of content and a target device may be made using an interface at the control device, wherein the interface includes tiles representing one or more content sources and tiles representing one or more target devices. A user may use various input techniques, such as drag-and-drop, to select a content source and a target device through which to display content associated with the content source.

Figure 1:
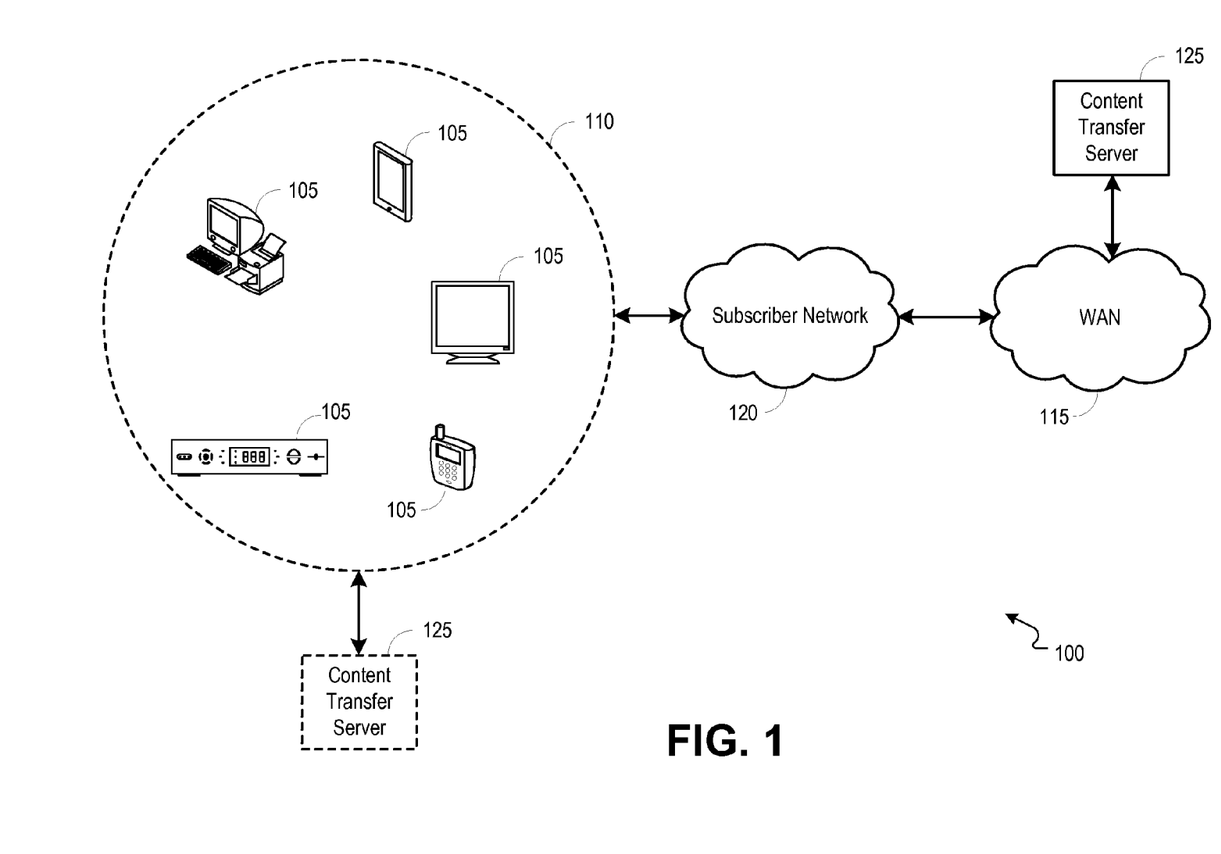
FIG. 1 is a block diagram illustrating an example network environment operable to facilitate the control of displayed content at multiple devices.

FIG. 1 is a block diagram illustrating an example network environment 100 operable to facilitate the control of displayed content at multiple devices. In embodiments, video, voice, and/or data services may be delivered to one or more client devices 105. Client devices 105 may include a television, mobile device, tablet, computer, set-top box (STB), gaming device, and any other device operable to receive video, voice, and/or data services. It should be understood that various multimedia services may be delivered to the client devices 105, including but not limited to, live television, video-on-demand (VoD) content, pay-per view content, audio-only content, and Internet or application content such as YouTube or Netflix content. It should be further understood that a television may be connected to and controlled by a STB.

Multiple services may be delivered to client devices 105 over a local network 110. The local network 110 may include a local area network (LAN), wireless local area network (WLAN), personal area network (PAN), mobile hotspot network, and others. The local network 110 may be provided at a subscriber premise by a gateway device, modem device, or other access device. It will be appreciated by those skilled in the relevant art that delivery of the multiple services over the local network 110 may be accomplished using a variety of standards and formats.

In embodiments, multiple services (e.g., video, voice, and/or data services) may be delivered from a wide-area network (WAN) 115 to the local network 110 through a connection to a subscriber network 120. The subscriber network may include an optical network, hybrid fiber coaxial (HFC) network, twisted-pair, mobile network, high-speed data network, and others. Multiple systems operator (MSO) devices and/or networks within the WAN 120 may be used to provide, manage, and/or troubleshoot the multiple services provided to subscribers.

It will be appreciated by those skilled in the relevant art that client devices 105 may be capable of interacting and communicating with each other over various wireless communication standards (e.g., Wi-Fi, Bluetooth, etc.). Client devices 105 connected to a home network 110 may receive services according to one or more subscriptions between a subscriber and service provider.

In embodiments, a client device 105 can be configured to provide a subscriber with an interface for managing content received and displayed by one or more other client devices 105. For example, a subscriber can access an application through a client device 105, wherein the subscriber can view other client devices 105 which can be managed through the application, can identify programming information associated with content being displayed on the other client devices 105, and can choose one or more of the other client devices 1105 through which to display subscriber-selected content.

A subscriber can initiate at a client device 105, an application configured to manage content received and displayed at one or more other client devices 105. In embodiments, when a subscriber initiates the application, a message can be sent from the initiating client device 105 to a content transfer server 125. The content transfer server 125 may store information associated with client devices 105 under the control of a subscriber, content provided to the client devices, and subscription information associated with the client devices 105. It should be understood that the content transfer server 125 may be located at a network back office (e.g., connected to the WAN 115), or may be located within a subscriber premise (e.g., connected to the local network 110).

In embodiments, the content transfer server 125 can maintain a list of client devices 105 that are connected to a local network 110 and/or are otherwise associated with a client device initiating a content transfer application. For example, the content transfer server 125 can periodically request connection updates from client devices 105 or can receive notification when a client device 105 makes a new association with another client device or when a new client device 105 joins the local network 110.

The content transfer server 125 can maintain current status information associated with each client device 105 (e.g., power state, tuning state, content displayed). For example, the content transfer server 125 may periodically request state information and/or tuning/content information from each of the client devices 105 or the content transfer server 125 may receive status updates from a client device when the client device experiences a power state change (e.g., powers up or down) or when the client device tunes to a different channel or content source. It will be appreciated by those skilled in the relevant art that the content transfer server 125 can use various communication techniques and methods to maintain a current list of client devices and corresponding status information.

The content transfer server 125 can maintain subscription information associated with one or more client devices 105 or a subscriber associated with the client devices 105. For example, the content transfer server 125 may have access to subscription information (e.g., internally or through a connection to an external server), and can determine what services and/or programming is available to a client device 105 or subscriber by looking up the corresponding subscription information.

The content transfer server 125 can respond to the initiating client device 105 by sending the client device 105 information associated with the client devices 105 under the control of the subscriber, content provided to the client devices, and subscription information associated with the client devices 105. An interface displayed at the client device 105 can show each of the one or more client devices 105 that are capable of being controlled by the application. The interface may also show information associated with the content (e.g., program information such as title, channel, summary, etc.) currently being displayed at each of the client devices 105. Each of the client devices 105 may be listed within the interface as a window or tile, and each window or tile may be displayed as a screenshot or thumbnail of content currently being viewed on the associated client device 105.

In embodiments, subscriber information may be used at the initiating client device 105 to generate a list of content that is available to the subscriber. For example, a list of available content including, but not limited to television channels, pay-per view content, VoD or recorded content, Internet multimedia content, pictures, music, HTML5 objects, file system objects, and others may be displayed within an interface at the initiating client device 105.

In embodiments, a subscriber using the initiating client device 105 can select content and can select one or more client devices 105 through which the selected content is to be displayed. Selected content may include content being currently viewed at one of the client devices 105 or may include content that is selected from a list of content available to the subscriber, and the selected client device(s) 105 may be any of the client devices 105 that are configured to receive the selected content. When the subscriber selects the content and target client device(s) 105 (e.g., the client device 105 selected for displaying the content), the initiating, or control, client device 105 can generate and output a message to the content transfer server 125, wherein the message includes information identifying the selected content and the target client device(s) 105.

The content transfer server 125 can generate and transmit a message to the target client device(s) 105, wherein the message includes content information to allow the target client device(s) 105 to tune to the selected content. The content information can include a channel or source identifier (e.g., channel number, uniform resource locator (URL), etc.), and can further include identification of a specific segment of the content from which to begin playback of the content. For example, the subscriber may request that the target client device 105 begins playback of the content from the point at which the content was paused or most recently displayed at a different client device 105. When the target client device 105 receives the message from the content transfer server 125, the target client device 105 can tune to the content identified within the message. It will be appreciated by those skilled in the relevant art that the identified content may be transcoded according to one or more formats associated with the target device before or during reception of the content by the target device.

In embodiments, the content transfer server 125 can output a message to the one or more target client devices 105, the message causing the target client device to prompt a user whether to decline or accept the shared or transferred content. For example, the target client device 105 can display an interface to a user, wherein the interface provides the user with information associated with the shared or transferred content (e.g., program information, information identifying the source or transferring user, etc.). The user can then select an option to decline or accept the offer to display the content on the target client device 105.

In embodiments, the application interface can provide a subscriber with the option to transfer or share content being viewed on a source client device 105 to a target client device 105. If the subscriber chooses to transfer content from the source client device 105 to the target client device 105, the content transfer server 125 can send a message to the source client device 105 causing the source client device 105 to cease display of the content and/or to power down, and can send a message to the target client device 105 causing the target client device 105 to tune to the content and/or to be powered on.

Figure 2:
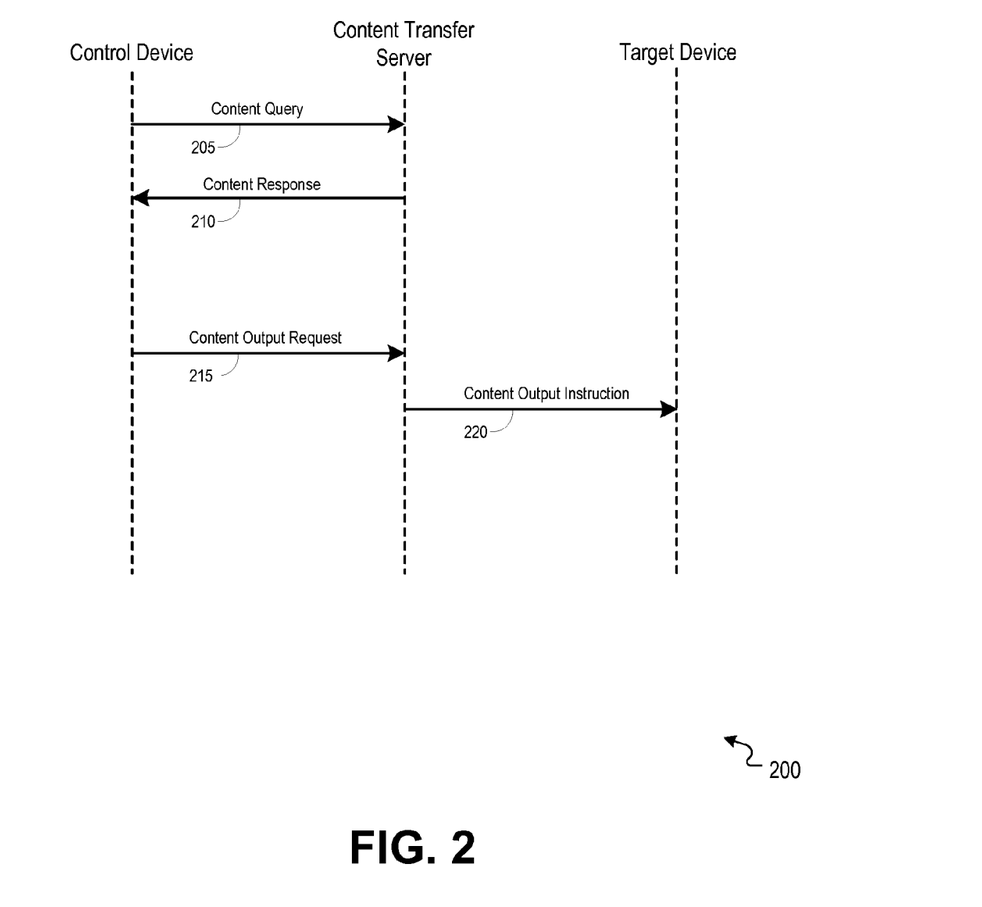
FIG. 2 is a transition diagram showing communications operable to facilitate the control of displayed content at multiple devices.

FIG. 2 is a transition diagram 200 showing communications operable to facilitate the control of displayed content at multiple devices. In embodiments, a subscriber can initiate a content transfer application at a client device (e.g., client device 105 of FIG. 1 such as a mobile device, tablet, STB, etc.). The content transfer application may be initiated from within another content application at a client device (e.g., a streaming content application). When a content transfer application is initiated at a client device, the control device, a content query 205 can be generated and output from the control device to a content transfer server (e.g., content transfer server 125 of FIG. 1). The content query 205 may include information identifying the control device, a network (e.g., local network 110 of FIG. 1) to which the control device is connected, one or more other devices associated with the control device (e.g., other client devices 105 connected to the local network 110), and/or subscription information associated with the control device.

In embodiments, the content transfer server can respond to a received content query by generating and outputting a content response 210 to the control device. The content response 210 may include information for populating a list of one or more devices that may be controlled by the control device and/or a list of content available for output to a target device. For example, the content response 210 can include information identifying one or more client devices connected to the same local network as the control device and/or content currently being displayed at the identified client devices. The content transfer server can be aware of devices associated with a control device as well as content being displayed at each of the devices, and the content transfer server can generate a content response 210 based upon an identification of the control device within the content query 205.

The content response 210 may include information for populating a list of content that may be output at a target device. For example, subscription information associated with a control device or subscriber may be used to identify available content and content sources. Content available for output to a target device may include live television, recorded content, VoD content, pay-per view content, Internet or application multimedia content (e.g., YouTube, Netflix, etc.), pictures, music and others.

At the control device, a subscriber can interface with the list of available client devices 105 and content. The subscriber can select content and one or more client devices 105 through which to display the content, the target device(s). A subscriber may select content by selecting a client device 105 currently displaying the selected content or by selecting content or a content source from a list of available content and/or content sources.

When the subscriber selects content by selecting a client device 105 through which the content is currently being displayed, a source device, the subscriber can be prompted to choose whether to transfer the content from the source device to the target device(s), or share the content with the target device(s). If a transfer option is selected, the content transfer server can cause the source device to cease output of the content currently being displayed at the source device and can cause the target device to begin output of the content from the point at which the source device stopped displaying the content. If a share option is selected, the content transfer server can cause the target device(s) to begin outputting content from the point at which the content is displayed on the source device at the time the share request is made. For example, playback of the content may be synchronized on the source device and the target device. It should be understood that the selected content can be displayed at the target device from any point within the content. For example, the target device can access selected content from storage (e.g., content recorded at a digital video recorder (DVR)), and a user can select a point from within the content at which to begin playback of the content. It should be understood that a user viewing the content on a target device may control the output of content at the target device. For example, the user can control playback of the content and/or choose a location from which to begin playback of the content using trickplay controls (e.g., rewind, fast-forward, skip, restart, etc.).

In embodiments, when content and a target device are selected at the control device, a content output request 215 may be generated and output from the control device to the content transfer server. The content output request 215 may include information identifying content and/or content source, a target device, and/or state information (e.g., information identifying a specific location within the content from which to begin playback of the content at the target device). The content output request 215 may identify other options for playback of the selected content at the identified target device. For example, the content output request 215 can request that the content be displayed at the target device from the beginning of the content, or from any other point within the content. The content transfer server may be aware of the status and the content being displayed at each client device 105, such that the content output request 215 may only identify a source device, and the content transfer server can then determine the content currently being displayed at the selected source device.

In response to receiving a content output request 215, the content transfer server can generate and output a content output instruction 220 to the target device identified in the content output request 215. The content output instruction 220 can include information identifying content and/or content source from which to output content at the target device. For example, the content output instruction 220 can include information that may be used by the target device to tune to the identified content. The content output instruction 220 may also include playback information (e.g., an identification of a specific location within the content from which to begin playback of the content at the target device). In embodiments, the content output instruction 220 may include a command to power up the target device (e.g., using an HDMI/CEC command). The content transfer server may output a prompt to the target device, the prompt asking a user to choose whether to continue viewing content being displayed at the target device or to view the content being transferred to or shared with the target device.

In embodiments, a user may be presented with various options for controlling the output of content at target devices and/or source devices. For example, a user can be prompted at an interface to select whether to share selected content with or transfer selected content to a target device. If the user selects the option to share selected content, the source device (e.g., the selected client device that is currently displaying the desired content) can continue to display the content currently being displayed. If the user selects the option to transfer the selected content, the source device can be instructed to cease display of the content. For example, the content transfer server can generate and output a command to the source device, wherein the command initiates the powering down of the source device. The command may be received at a STB and the STB can power down a connected television (e.g., using an HDMI/CEC command). It should be understood that the STB may be powered down or a tuner associated with the STB may be tuned away from the current channel in order to cause the source device to cease output of the selected content.

Figure 3:
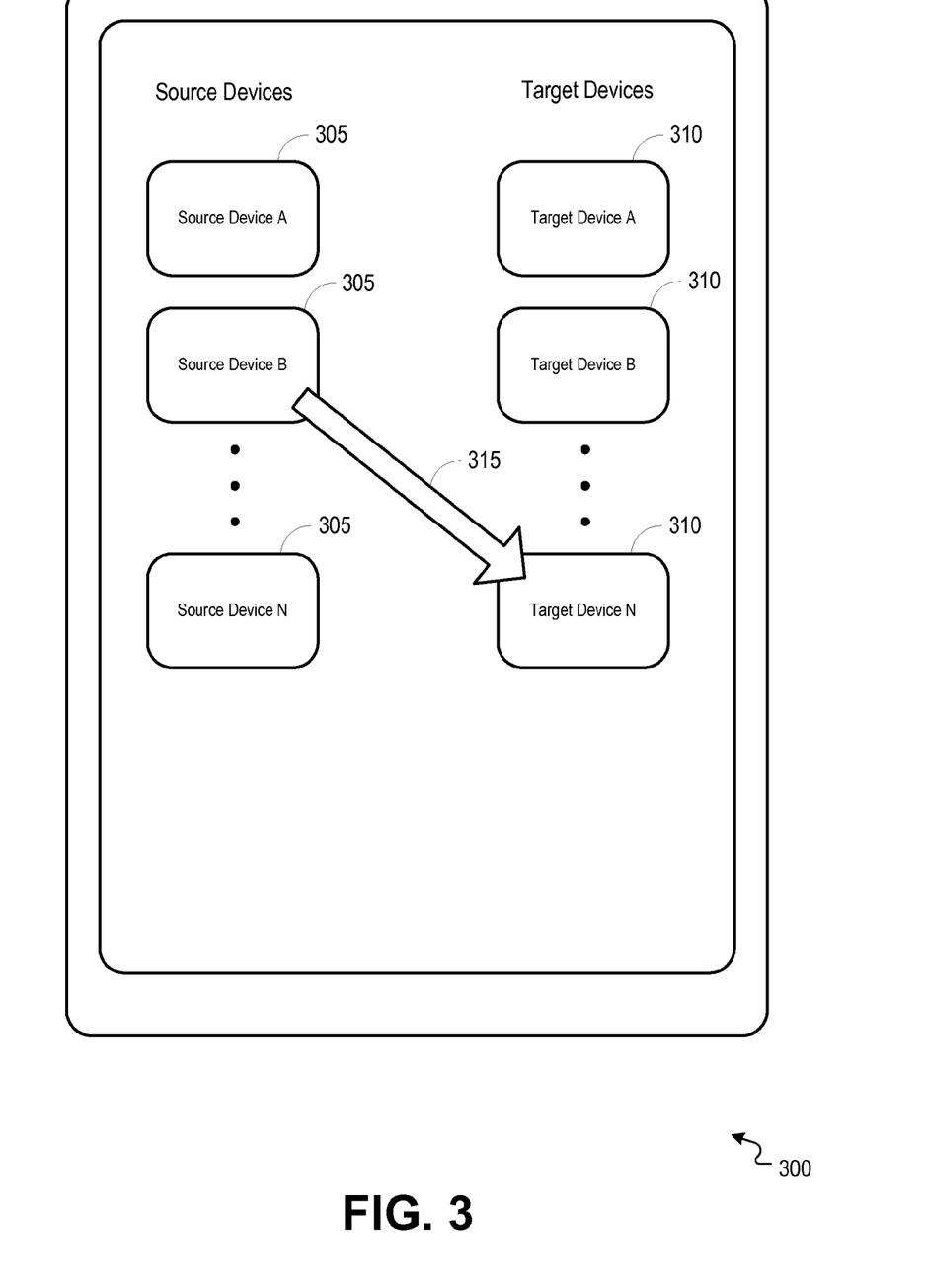
FIG. 3 is an illustration of an example interface operable to facilitate the selection of content for display at a target device.

FIG. 3 is an illustration of an example interface 300 operable to facilitate the selection of content for display at a target device. The interface 300 may be displayed at a control device (e.g., client device 105 of FIG. 1) upon an initiation of an application for controlling displayed content at a target device. It will be appreciated by those skilled in the relevant art that the interface 300 may be displayed to a subscriber using various interface types (e.g., graphical user interface (GUI), touch-screen interface, etc.).

The interface 300 may include a list of one or more source devices and a list of one or more target devices. The one or more source devices and target devices may be represented as one or more source device tiles 305 and one or more target device tiles 310. Each of the source device tiles 305 and target device tiles 310 may be associated with a device (e.g., client device 105 of FIG. 1) that may be connected to a local network (e.g., local network 110 of FIG. 1) or that may otherwise be controlled by a subscriber. The source device tiles 305 and target device tiles 310 may be generated based upon information received from a content transfer server 125 of FIG. 1.

In embodiments, each of the source device tiles 305 and target device tiles 310 can identify the device with which it is associated and can identify content that is currently being displayed by the device. The source device tiles 305 and/or target device tiles 310 may comprise a screenshot or video feed of the content that is currently being displayed at the associated device. Content information, screenshots, and/or video feeds associated with content may be generated based upon information received from a content transfer server 125 of FIG. 1.

In embodiments, a selection of content to be displayed at a target device may be made through an input technique 315. The input technique 315 may be a selection of a source device tile 305 and a selection of a target device tile 310 using a pointer or finger in a touch-screen application. The input technique 315 may be a drag-and-drop technique where a subscriber selects a source device tile 305 (e.g., using a pointer or a finger), drags a virtual object representing the selected source device tile 305 to a target device tile 310, and drops or releases the virtual object at the target device tile 310. It should be understood that various interface techniques may be used to match a source device tile 305 with a target device tile 310 using the interface 300. The selected source device tile 305 may be dropped or released at one or more target device tiles 310.

When a source device tile 305 is matched with a target device tile 310 using the input technique 315, the control device can generate a message (e.g., content output request 215 of FIG. 2) and output the message to a content transfer server 125 of FIG. 1. The message may include information identifying the selected source device, content being displayed at the source device, and/or the selected target device.

Figure 4:
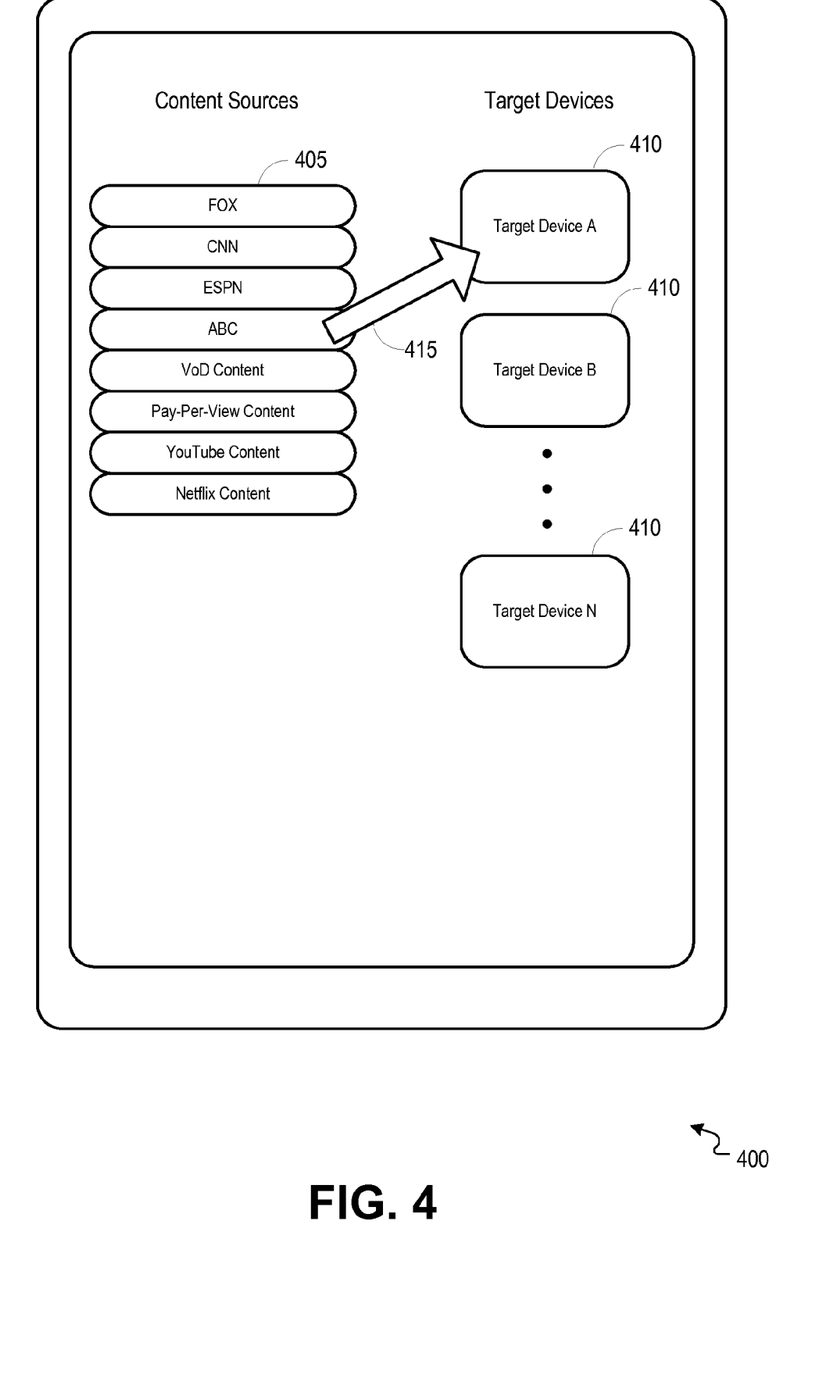
FIG. 4 is an illustration of an example interface operable to facilitate the selection of content for display at a target device.

FIG. 4 is an illustration of an example interface 400 operable to facilitate the selection of content for display at a target device. The interface 400 may be displayed at a control device (e.g., client device 105 of FIG. 1) upon an initiation of an application for controlling displayed content at a target device. It will be appreciated by those skilled in the relevant art that the interface 400 may be displayed to a subscriber using various interface types (e.g., graphical user interface (GUI), touch-screen interface, etc.).

The interface 400 may include a list of one or more content sources. The one or more content sources may be represented as one or more content source tiles 405. Each of the content source tiles 405 may be associated with a content source from which a target device may output content. The one or more content sources may include sources available to a subscriber or client device, for example, content sources made available through a subscription. Content sources may include live television channels, recorded content, VoD content, pay-per view content, Internet or application multimedia content (e.g., YouTube, Netflix, etc.), sources of pictures, sources of music, and others. The list of content source tiles 405 may be generated and displayed at the interface 400 based upon information received from a content transfer server 125 of FIG. 1.

The interface 400 may include a list of one or more target devices. The one or more target devices may be represented as one or more target device tiles 410. Each of the target device tiles 410 may be associated with a device (e.g., client device 105 of FIG. 1) that may be connected to a local network (e.g., local network 110 of FIG. 1) or that may otherwise be controlled by a subscriber. The target device tiles 410 may be generated based upon information received from a content transfer server 125 of FIG. 1.

In embodiments, each of the target device tiles 410 can identify the device with which it is associated and can identify content that is currently being displayed by the device. The target device tiles 410 may comprise a screenshot or video feed of the content that is currently being displayed at the associated device. Content information, screenshots, and/or video feeds associated with content may be generated based upon information received from a content transfer server 125 of FIG. 1.

In embodiments, a selection of content to be displayed at a target device may be made through an input technique 415. The input technique 415 may be a selection of a content source tile 405 and a selection of a target device tile 410 using a pointer or finger in a touch-screen application. The input technique 415 may be a drag-and-drop technique where a subscriber selects a content source tile 405 (e.g., using a pointer or a finger), drags a virtual object representing the selected content source tile 405 to a target device tile 410, and drops or releases the virtual object at the target device tile 410. It should be understood that various interface techniques may be used to match a content source tile 405 with a target device tile 410 using the interface 400. The virtual object representing the selected content source may be dropped or released at one or more target device tiles.

When a content source tile 405 is matched with a target device tile 410 using the input technique 415, the control device can generate a message (e.g., content output request 215 of FIG. 2) and output the message to a content transfer server 125 of FIG. 1. The message may include information identifying the selected content source and the selected target device.

Figure 5:
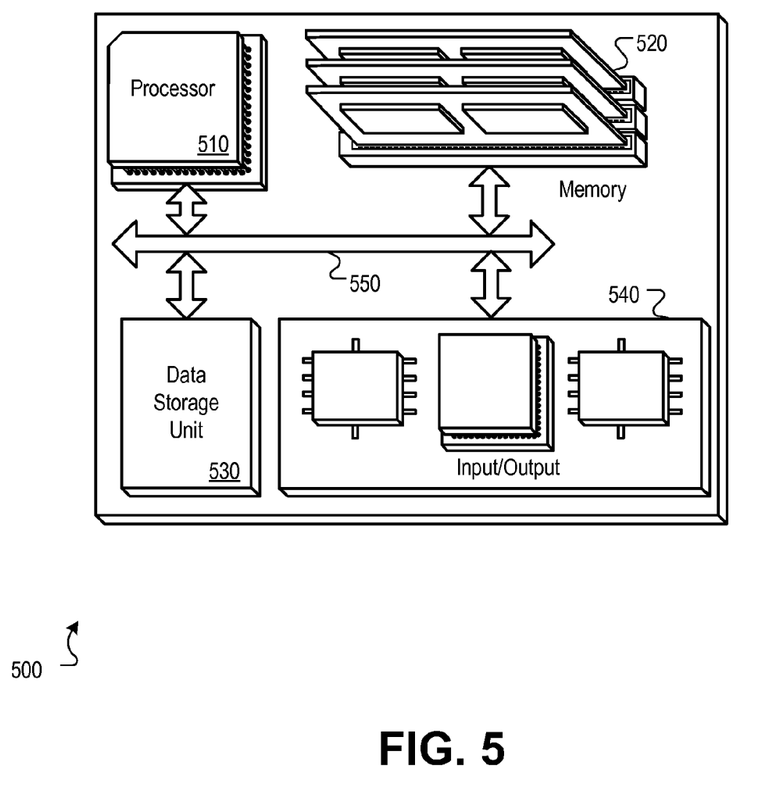
FIG. 5 is a block diagram of a hardware configuration operable to facilitate the control of displayed content at multiple devices.

FIG. 5 is a block diagram of a hardware configuration 500 operable to facilitate the control of displayed content at multiple devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g, television, computer, tablet, mobile device, etc.). In embodiments, the input/output device can include driver devices configured to send communications to, and receive communications from one or more networks (e.g., subscriber network 120 of FIG. 1, WAN 115 of FIG. 1, etc.).

Those skilled in the art will appreciate that the invention improves upon methods and systems for controlling display of content at multiple devices. The methods, systems, and computer readable media described in this disclosure enable the transfer and/or sharing of content between multiple devices. An interface may be used by a subscriber to cause content being viewed on a first device to be displayed at one or more other devices. Using an interface at a control device or source device, a user can select a content source, one or more target devices, and various options for outputting content from the content source at the target device(s). Selected content may be shared with or transferred to a target device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
 outputting a message to a control device, wherein the message comprises content source information and target device information, the content source information comprising information identifying one or more content sources and the target device information comprising information identifying one or more target devices;

receiving a message from the control device, wherein the message comprises an identification of a user-selected content source and an identification of one or more user-selected target devices, the user-selected content source comprising a client device from which a piece of content is output;

using the identification of the client device and a stored association between the client device and a piece of content currently output from the client device, identifying the piece of content that is output from the client device;

generating a content output instruction, wherein the content output instruction comprises information associated with the user-selected content source, the information identifying the piece of content that is output from the client device; and outputting the content output instruction to the one or more user-selected target devices, wherein the content output instruction comprises information to be used by the one or more user-selected target devices to retrieve the piece of content that is output at the user-selected content source.

2. The method of claim 1, wherein the content output instruction further comprises information identifying a point within the piece of content at which the piece of content is output at the user-selected content source when the content output instruction is generated.

3. The method of claim 1, wherein the user-selected content source comprises the control device.

4. The method of claim 1, wherein a user-selected target device of the one or more user-selected the target devices is not in a powered-on state and the content output instruction further comprises a command for initiating the powering on of the user-selected target device.

5. The method of claim 1, further comprising:
receiving a message from the control device, the message comprising subscriber information associated with the control device;
determining programming or services available to the control device based upon the subscriber information; and
wherein the one or more content sources comprise the programming or services available to the control device.

6. The method of claim 1, further comprising:
outputting a message to the client device, the message requesting that the client device cease output of the piece of content.

7. An apparatus comprising:
an interface configured to be used to output a message to a control device, wherein the message comprises content source information and target device information, the content source information comprising information identifying one or more content sources and the target device information comprising information identifying one or more target devices;
an interface configured to be used to receive a message from the control device, wherein the message comprises an identification of a user-selected content source and an identification of one or more user-selected target devices, the user-selected content source comprising a client device from which a piece of content is output;

a module configured to identify the piece of content that is output from the client device by using the identification of the client device and a stored association between the client device and a piece of content currently output from the client device, and the module is further configured to generate a content output instruction, wherein the content output instruction comprises information associated with the user-selected content source, the information identifying the piece of content that is output from the client device; and an interface configured to be used to output the content output instruction to the one or more user-selected target devices, wherein the content output instruction comprises information to be used by the one or more user-selected target devices to retrieve the piece of content that is output at the user-selected content source.

8. The apparatus of claim 7, wherein the content output instruction further comprises information identifying a point within the piece of content at which the piece of content is output at the user-selected content source when the content output instruction is generated.

9. The apparatus of claim 7, wherein the user-selected content source comprises the control device.

10. The apparatus of claim 7, wherein a user-selected target device of the one or more user-selected target devices is not in a powered-on state and the content output instruction further comprises a command for initiating the powering on of the user-selected target device.

11. The apparatus of claim 7, further comprising:
an interface configured to be used to receive a message from the control device, the message comprising subscriber information associated with the control device;
a module configured to determine programming or services available to the control device based upon the subscriber information; and
wherein the one or more content sources comprise the programming or services available to the control device.

12. The apparatus of claim 7, further comprising:
an interface configured to be used to output a message to the client device, the message requesting that the client device cease output of the piece of content.

13. One or more non-transitory computer readable media having instructions operable to cause one or more processors to perform the operations comprising:
outputting a request for content source information and target device information, the content source information comprising information identifying one or more content sources and the target device information identifying one or more target devices;
receiving the requested content source information and target device information;
generating an interface comprising a list of content sources and a list of target devices;
receiving content selection input identifying a content source from the list of content sources, wherein the user-selected content source comprises a client device from which a piece of content is output;
receiving target device input identifying one or more target devices from the list of target devices; and
outputting a message identifying the identified content source and the one or more identified target devices.

14. The one or more non-transitory computer-readable media of claim 13, wherein each of the content sources and target devices are represented within the interface as an object.

15. The one or more non-transitory computer-readable media of claim 14, wherein the content selection input and the target device input comprises a drag-and-drop technique, wherein a user selects a content source object, drags a virtual object representing the selected content source object to one or more target device objects, and drops the virtual object at the one or more target device objects.

16. The one or more non-transitory computer-readable media of claim 14, wherein each object comprises a screenshot of content being displayed at the respective content source or target device.

17. The one or more non-transitory computer-readable media of claim 13, wherein the instructions are further operable to cause one or more processors to perform the operations comprising:
- outputting a message comprising subscriber information; and
- wherein the one or more content sources comprise available programming or services according to the subscriber information.

18. The one or more non-transitory computer-readable media of claim 13, wherein the instructions are further operable to cause one or more processors to perform the operations comprising:
- wherein the content sources comprise one or more client devices; and
- outputting a message comprising information identifying a point within content at which the content is output at the identified content source when the content source is identified.

* * * * *